US010475166B2

(12) United States Patent
Nakamura et al.

(10) Patent No.: US 10,475,166 B2
(45) Date of Patent: Nov. 12, 2019

(54) VIDEO IMAGE ENHANCEMENT METHOD

(71) Applicant: PANASONIC INTELLECTUAL PROPERTY MANAGEMENT CO., LTD., Osaka (JP)

(72) Inventors: Hideyuki Nakamura, Fukuoka (JP); Tadanori Tezuka, Fukuoka (JP); Masao Hamada, Fukuoka (JP); Tsuyoshi Nakamura, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 63 days.

(21) Appl. No.: 15/580,963

(22) PCT Filed: May 10, 2016

(86) PCT No.: PCT/JP2016/022281
§ 371 (c)(1),
(2) Date: Dec. 8, 2017

(87) PCT Pub. No.: WO2016/203699
PCT Pub. Date: Dec. 22, 2016

(65) Prior Publication Data
US 2018/0182073 A1    Jun. 28, 2018

(30) Foreign Application Priority Data
Jun. 18, 2015    (JP) .................................. 2015-123148

(51) Int. Cl.
*G06T 5/00* (2006.01)
*H04N 5/208* (2006.01)

(52) U.S. Cl.
CPC .............. *G06T 5/003* (2013.01); *G06T 5/004* (2013.01); *H04N 5/208* (2013.01);
(Continued)

(58) Field of Classification Search
CPC ..................... G06T 5/003; G06T 5/004; G06T 2207/10016; G06T 2207/20012; G06T 2207/20192; H04N 5/008
See application file for complete search history.

(56) References Cited

U.S. PATENT DOCUMENTS

| 8,509,560 B2 | 8/2013 | Lin et al. |
| 2001/0019278 A1 | 9/2001 | Sudo et al. |

(Continued)

FOREIGN PATENT DOCUMENTS

| GB | 2423660 A | 8/2006 |
| JP | 2000-312301 A | 11/2000 |

(Continued)

OTHER PUBLICATIONS

U.S. Appl. No. 15/867,173 to Masao Hamada et al., filed Jan. 10, 2018.

(Continued)

*Primary Examiner* — Leon Flores
(74) *Attorney, Agent, or Firm* — Greenblum & Bernstein, P.L.C.

(57) ABSTRACT

There is provided is a method for enhancing a video image capable of achieving high image quality improvement for both a texture area and an edge area. A maximum limit value and a minimum limit value of a video signal value enhanced on the basis of a pixel signal value in an area set around the target pixel are calculated, the maximum limit value and the minimum limit value are corrected according to a texture value calculated as a scale value that indicates a variation of the pixel signal value in the corresponding area, and the corrected maximum limit value and minimum limit value are applied to the enhanced video signal value.

3 Claims, 5 Drawing Sheets

(52) U.S. Cl.
CPC ............ *G06T 2207/10016* (2013.01); *G06T 2207/20012* (2013.01); *G06T 2207/20192* (2013.01)

(56) References Cited

U.S. PATENT DOCUMENTS

| | | |
|---|---|---|
| 2003/0173594 A1 | 9/2003 | Sudo et al. |
| 2006/0192897 A1* | 8/2006 | Morphet ............... H04N 5/142 348/625 |
| 2007/0279530 A1 | 12/2007 | Fok |
| 2010/0027905 A1 | 2/2010 | Zhang et al. |
| 2010/0322536 A1* | 12/2010 | Tezuka ..................... G06T 3/00 382/300 |
| 2012/0301049 A1 | 11/2012 | Mori |
| 2013/0107123 A1 | 5/2013 | Morphet |
| 2014/0340515 A1 | 11/2014 | Tanaka et al. |
| 2016/0165096 A1* | 6/2016 | Suzuki ................ H04N 1/4092 382/266 |

FOREIGN PATENT DOCUMENTS

| | | |
|---|---|---|
| JP | 2008-532376 A | 8/2008 |
| JP | 2010-212782 A | 9/2010 |
| JP | 2012-249079 A | 12/2012 |

OTHER PUBLICATIONS

Official Communication issued in International Patent Application No. PCT/JP2016/002281, dated Jul. 19, 2016, along with an English translation thereof.
The Extended European Search Report dated Apr. 5, 2018 for the related European Patent Application No. 16811180.5.

* cited by examiner

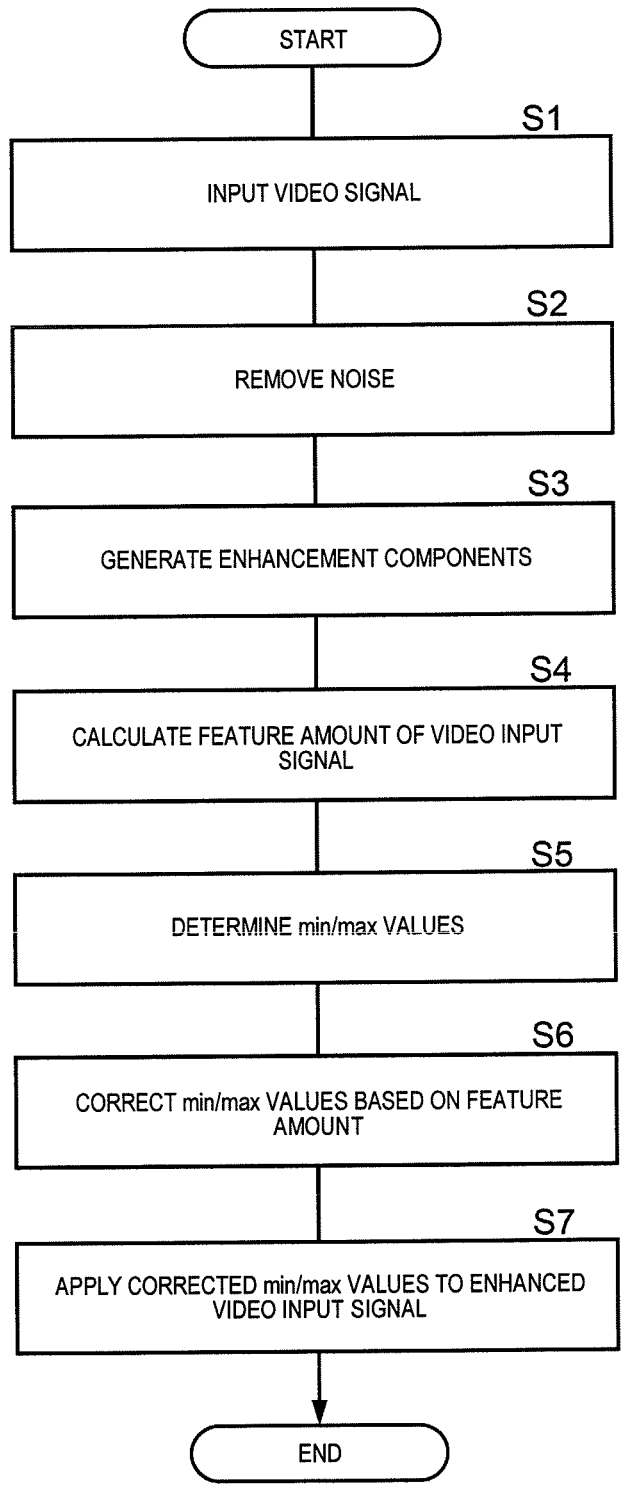

VIDEO IMAGE ENHANCEMENT METHOD

TECHNICAL FIELD

The present disclosure relates to a method for enhancing a video image, and more particularly to a method for enhancing a video image such that a texture area is suitably enhanced and excessive overshoot in an edge area may be avoided.

BACKGROUND ART

Various methods are known for improving images that are called blurred images and lack sharpness. In many cases, the methods consist of sharpening edges in an image by enhancing high-frequency components of a video signal. In this case, if the enhancement is insufficient, the sharpness of the image becomes insufficient, giving a blurred impression. However, if the enhancement is excessive, overshoot occurs in a pixel signal at an edge, and noticeable edging occurs, giving an unnatural impression.

Therefore, in the related art, according to the state of an original image, how much the outline enhancement is appropriate is made by using some evaluation functions or human judgment.

In addition, in order to achieve natural outline enhancement, a frequency characteristic of a filter is selected according to the contents of the image by using a high-pass filter, and in particular, the quality of the image is optimized by adjusting a gain of the high-frequency component. For example, in PTL 1, it is proposed to obtain a preceding signal (S1), a target signal (S2), and a delayed signal (S3) by processing an input signal by using two delay means provided in series with each other and set a value with the smallest absolute value among the secondary differential signals which are given as a difference between the target signal (S2) and the preceding signal (S1), a difference between the delay signal (S3) and the target signal (S2), and a difference between the target signal (S2) and an average value of the preceding signal (S1) and the delayed signal (S3), to which a sign of the secondary differential signal is added, as an outline enhancement signal. In PTL 2, a technique of calculating a maximum value and a minimum value of densities of pixels of a target small area and suppressing an overshoot amount due to an outline enhancement processing according to the maximum and minimum values.

However, generally, an image includes areas having various different characteristics, and in a case where specific outline enhancement is performed, the image quality improvement result varies depending on the areas. That is, generally, the image includes an area which is called a texture area where the density gradually changes regularly due to the properties of the surface of an object, edges are distributed complicatedly and an edge area including a clear edge such as a line or outline. Any area is an important factor in improving the quality of the image. Therefore, in order to enhance a video image, it is desirable that such an area is sharpened, and discomfort is not caused.

In addition, since it is highly necessary to enhance a video image in real time, it is desirable that suitable outline enhancement is possible without requiring a large amount of calculation.

CITATION LIST

Patent Literature

PTL 1: JP-A-2000-312301
PTL 2: JP-A-2008-532376

SUMMARY OF THE INVENTION

In view of such problems of the related art and the findings of the inventor, a main object of the present disclosure is to provide a method for enhancing a video image capable of achieving high image quality improvement without requiring a large amount of calculation for both a texture area and an edge area.

According to the present disclosure, the object is achieved by providing a method for enhancing a video image for enhancing an outline in a video image by generating an outline enhancement signal as a function of a pixel signal value in an area set around each target pixel and applying the outline enhancement signal to the target pixel, the method including: calculating a maximum limit value and a minimum limit value of an enhanced video signal value on the basis of the pixel signal value in the area set around the target pixel; calculating a texture value as a scale value that indicates a variation of the pixel signal value in the area; correcting the maximum limit value and the minimum limit value according to the texture value; and limiting the enhanced video signal value by the corrected maximum limit value and the minimum limit value.

In a texture area having a large texture value, that is, a texture area, enhancement of a video image may be performed more favorably by performing outline enhancement relatively strongly as compared with an edge area. That is, it is possible to sharpen the texture area and avoid unnatural edging due to overshoot of the pixel signal in the edge area. As a result, suitable image enhancement is possible as a whole over the texture area and the edge area.

BRIEF DESCRIPTION OF DRAWINGS

FIG. 2 is a flow diagram of one embodiment of the method for enhancing a video image according to the present disclosure.

DESCRIPTION OF EMBODIMENT

According to a preferred embodiment of the present disclosure, a maximum value and a minimum value of pixel signal value in an area set around a target pixel are detected, a maximum limit value of an enhanced video signal value is obtained by adding a product of a difference between the maximum value and the minimum value and a texture value from the maximum value, and a minimum limit value of the enhanced video signal value is obtained by subtracting the product of the difference between the maximum value and the minimum value and the texture value from the minimum value.

According to this, suitable outline enhancement may be performed by relatively simple arithmetic processing.

According to one aspect of the present disclosure, the texture value may be given as a value obtained by normalizing the value obtained by subtracting an absolute value of a difference in the number of times increase and decrease from the sum of the number of times of increase and decrease of the pixel signal value so that the maximum value becomes 1.

According to this, it is possible to appropriately reflect the texture value in the enhanced video signal value.

According to the aspect of the present disclosure, a maximum suppression value and a maximum value that are larger than the pixel value of the target pixel and smaller than the maximum value and a minimum suppression value that is smaller than the pixel value of the target pixel and larger than the minimum value are set, an outline enhancement signal value is decreased according to an exceeded amount in a case where the pixel signal value of the target pixel exceeds the maximum suppression value, and the outline enhancement signal value is increased according to a lower amount in a case where the pixel signal value of the target pixel is lower than the minimum suppression value.

According to this, it is possible to avoid sudden ceasing of the outline enhancement signal value, thereby realizing the outline enhancement of the image that gives a more natural impression.

Hereinafter, embodiments of the present disclosure will be described with reference to drawings.

Figure 1:
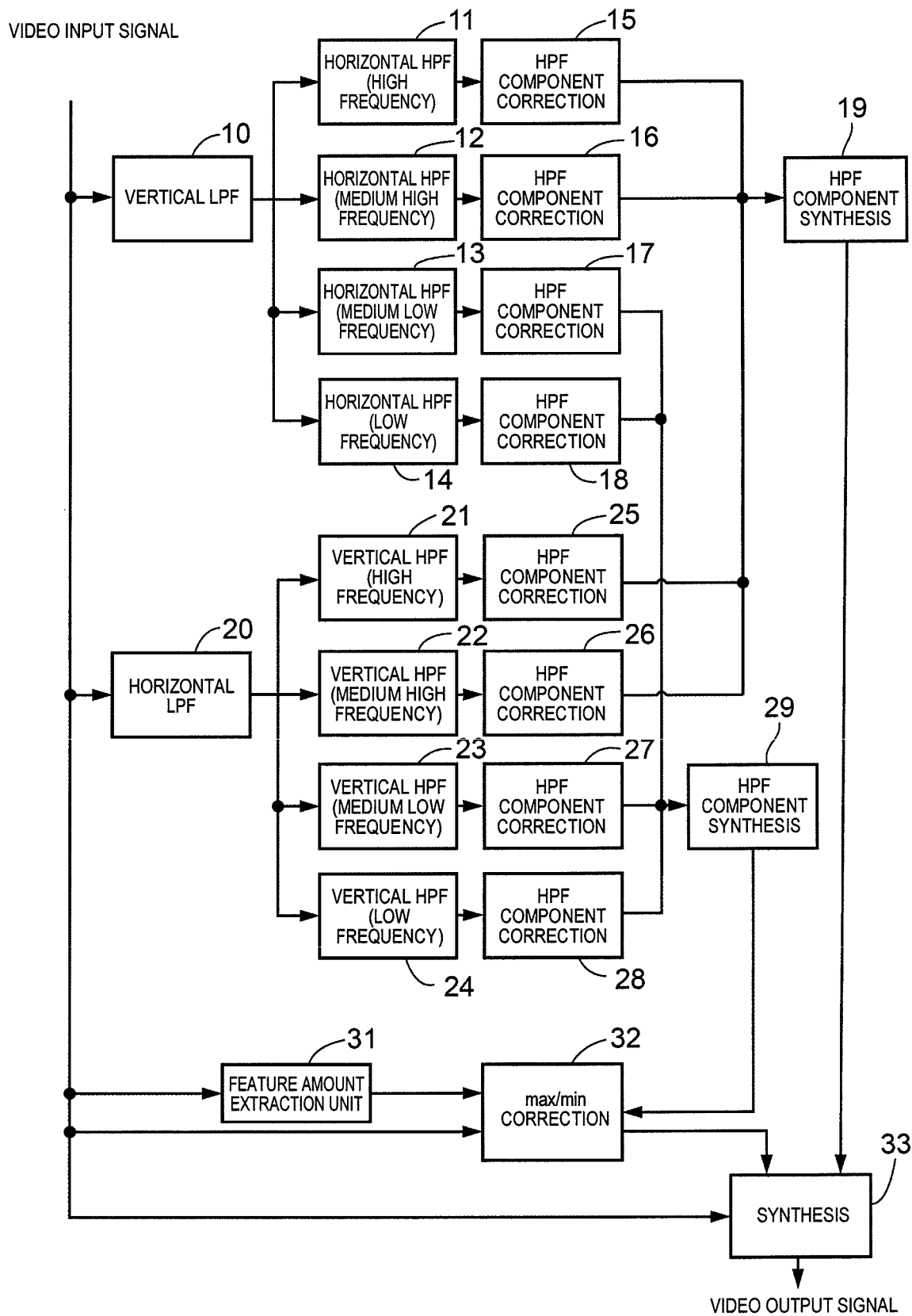
FIG. 1 is a diagram showing an example of a system configuration for implementing a method for enhancing a video image according to the present disclosure.

FIG. 1 is a diagram showing an example of a system configuration for implementing a method for enhancing a video image according to the present disclosure. A video input signal is provided to a vertical low-pass filter (LPF) 10 for removing noise from a change in a pixel value in the vertical direction and a horizontal low-pass filter (LPF) 20 for removing noise from the change in the pixel value in the horizontal direction. Outputs of the vertical low-pass filter 10 are supplied to a plurality of horizontal high-pass filters (HPF) 11 to 14 having different cutoff frequencies, and outputs of the horizontal low-pass filter 20 are supplied to a plurality of vertical high-pass filters (HPF) 21 to 24 having different cutoff frequencies. The outputs from the high-frequency side 11, 12, 21, and 22 among these high-pass filters are supplied to a high-frequency high-pass filter component synthesis unit 19 via individual variable gain units 15, 16, 25, and 26, and the outputs from the low-frequency side of these high-pass filters 13, 14, 23, and 24 are supplied to a low-frequency high-pass filter component synthesis unit 29 via individual variable gain units 17, 18, 27, and 28.

The outputs of the high-frequency high-pass filter component synthesis unit 19 are directly supplied to a synthesis unit 33, and the outputs of the low-frequency high-pass filter component synthesis unit 29 are supplied to a min/max correction unit 32. The video input signal is also supplied directly to the min/max correction unit 32 and is also supplied to the min/max correction unit 32 via a feature amount extraction unit 31 to be described later.

The outputs of the min/max correction unit 32 are supplied to the synthesis unit 33 as enhancement components together with the output of the high-frequency high-pass filter component synthesis unit 19 and applied to the video input signal to enhance the video input signal after being synthesized to obtain an outline enhancement video output signal.

As in this embodiment, outline enhancement may be performed in both horizontal and vertical directions, but may be performed only in one of the horizontal and vertical directions. In addition, the limitation or correction of the enhanced signal may be performed only for a signal with a relatively low-frequency component prevailing as in this embodiment, but may be performed only for a signal with a relatively low-frequency component prevailing or over the entire frequency range. The configuration of this embodiment is merely an example, and the filtering processing for the video input signal is not limited thereto and may be freely changed. In addition, in the present embodiment, only the output of the low-frequency high-pass filter component synthesis unit 29 is supplied to the min/max correction unit 32, but the output of the high-frequency high-pass filter component synthesis unit 19 may also be supplied to the min/max correction unit 32 so that the same min/max correction may be made.

FIG. 2 is a flow diagram of one embodiment of the method for enhancing a video image according to the present disclosure. First, noise is removed by passing the changes in the vertical and horizontal directions of the video input signal obtained in step S1 through the low-pass filters 10 and 20 (step S2). A plurality of horizontal high-pass filters 11 to 14 are applied to the video signal obtained by passing the change in the vertical direction through the low-pass filter 10, and a plurality of vertical high-pass filters 21 to 24 are applied to the video signal obtained by passing the change in the horizontal direction through the low-pass filter 20. Those on the high-frequency side of the components obtained from these horizontal high-pass filter and vertical high-pass filter are subjected to weighted addition by using the corresponding variable gain unit 15, 16, 25, and 26 and regarded as enhancement components on the high-frequency side (step S3). Those on the low-frequency side of the components obtained from these horizontal high-pass filter and vertical high-pass filter are subjected to weighted addition using the corresponding variable gain units 17, 18, 27, and 28 and regarded as enhancement components on the low-frequency side (step S3).

Next, a feature amount of the video input signal, for example, a texture value is calculated by the feature amount extraction unit 31 for each pixel or in area unit (step S4). The min/max value of the enhancement component is determined by using the min/max correction unit 32 based on the maximum value and the minimum value of the pixel value in the vicinity of the target pixel (step S5). Finally, by using the synthesis unit 33, an enhancement component is added to the video input signal or the like (step S6).

According to the present disclosure, the degree of outline enhancement is adjusted in consideration of the presence or absence of the texture area or the degree of texture. For this purpose, the change in pixel value in the vicinity of the target pixel in the video input signal (5×5 pixel matrix centered on the target pixel in this embodiment) is evaluated. That is, Horizontal texture value=(number of times of increase+number of times of decrease)−absolute value{number of times of increase−number of times of decrease}

Vertical texture value=(number of times of increase+number of times of decrease)−absolute value{number of times of increase−number of times of decrease}

Tex(texture value)=max{horizontal texture value, vertical texture value}×f(z)

However, z is the number of times without change.

Figure 3A:
FIG. 3A is a diagram showing an example of a method of calculating a texture value in the method for enhancing a video image according to the present disclosure.
Figure 3B:
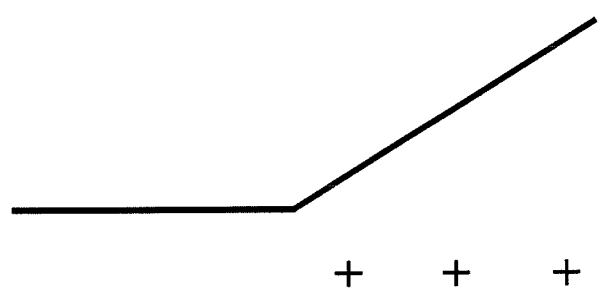
FIG. 3B is a diagram showing an example of a method of calculating the texture value in the method for enhancing a video image according to the present disclosure.
Figure 3C:
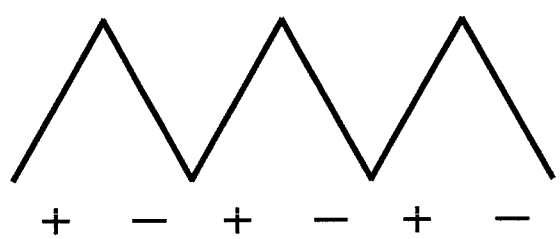
FIG. 3C is a diagram showing an example of a method of calculating the texture value in the method for enhancing a video image according to the present disclosure.
Figure 3D:
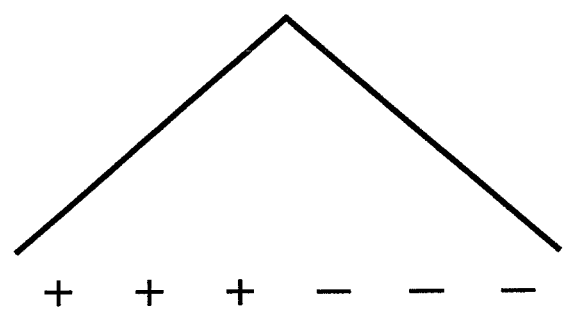
FIG. 3D is a diagram showing an example of a method of calculating the texture value in the method for enhancing a video image according to the present disclosure.

FIGS. 3A to 3D are diagrams showing examples of a method of calculating a texture value in a method for enhancing a video image. FIG. 3A corresponds to an area where the pixel signal value is constant, texture value=(0+0)−absolute value{0−0}=0, and the texture value is zero. This area is an area that is neither a texture area nor an edge area. FIG. 3B shows a case where the pixel signal value reaches a section monotonously increasing through a section in which the pixel signal value is constant, and in this case as well, the texture value=(3+0)−absolute value{3−0}=0 and the texture value is zero. This area forms an area which is possibly an edge area, but not a texture area. FIG. 3C is an area where the pixel signal value changes frequently for each pixel, and the texture value=(3+3)−absolute value{3−3}=6 and the texture value is 6. That is, this area forms a distinct texture area. FIG. 3D shows a case where the pixel signal value reaches a section monotonically decreasing through a monotonously increasing section, and in this case as well, the texture value=(3+3)−absolute value{3−3}=6 and the texture value is 6. That is, this area forms a texture area.

Figure 4:
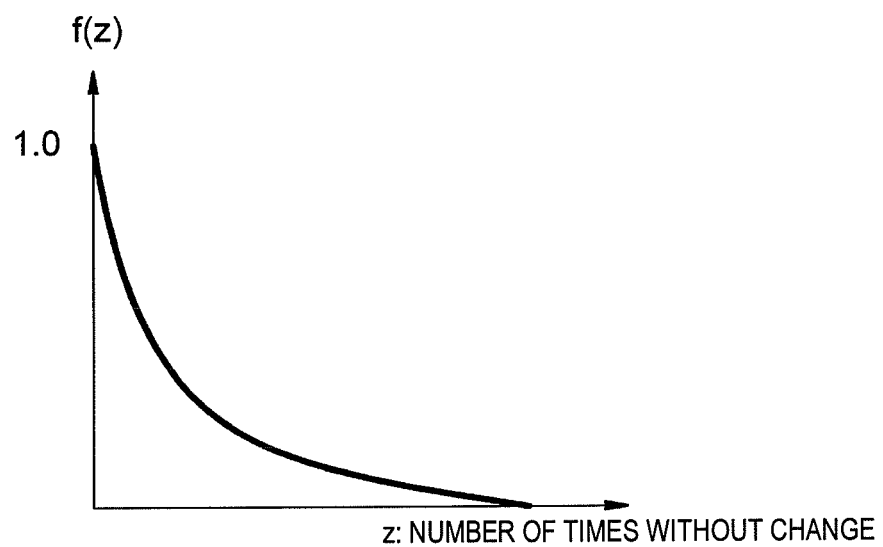
FIG. 4 is a graph showing an example of a function for normalizing the texture value.

FIG. 4 is a graph showing an example of a function f(z) for normalizing the texture value. In this case, a variable z is the number of times at which there is no sign change between the pixels, and a function f is a downwardly convex and monotonically decreasing function. The function value is 1 when the variable z is zero, and in a case where the variable z is large, the function value is 0 when z=5 in the case of the present example. However, this is only an example, and the function f may be a linear or downward concave function. In addition, even when the variable z is 0 or 5, the function value may be freely selected. That is, it is possible to freely select the function f so that a desired result may be obtained according to a specific situation.

Here, MaxOut and MinOut forming the maximum limit value and the minimum limit value at each pixel point of the outline enhancement video output signal are given by the following expressions.

Maxout=Max+ΔMax*g(Tex)

Minout=Min−ΔMin*g(Tex)

Figure 5:
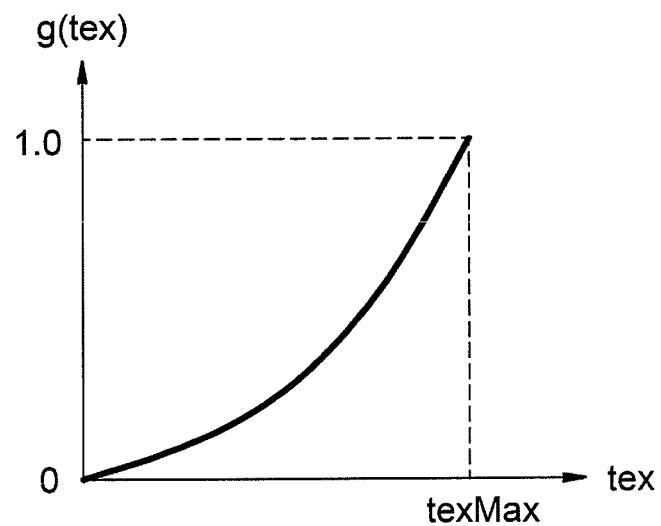
FIG. 5 is a graph showing an example of a function of the texture value used when correcting a maximum limit value and a minimum limit value of a video signal according to the texture value.

Here, Max and Min represent the maximum value and the minimum value of the pixel value in the vicinity of the target pixel (5×5 pixel matrix centered on the target pixel in this embodiment), respectively. For example, a function g is formed of a downwardly convex and monotonically increasing function as shown in FIG. 5, the function value is 0 when a texture value tex is zero, and the function value is 1 when the texture value tex is a maximum value texMax. Like the function f, the function g may also be freely selected so as to obtain a desired result according to a specific situation.

Furthermore, MaxDim (maximum suppression value) is set to a value larger than the pixel value of the target pixel and smaller than the maximum value, and MinDim (minimum suppression value) is set to a value smaller than the pixel value of the target pixel and larger than the minimum value.

Figure 6:
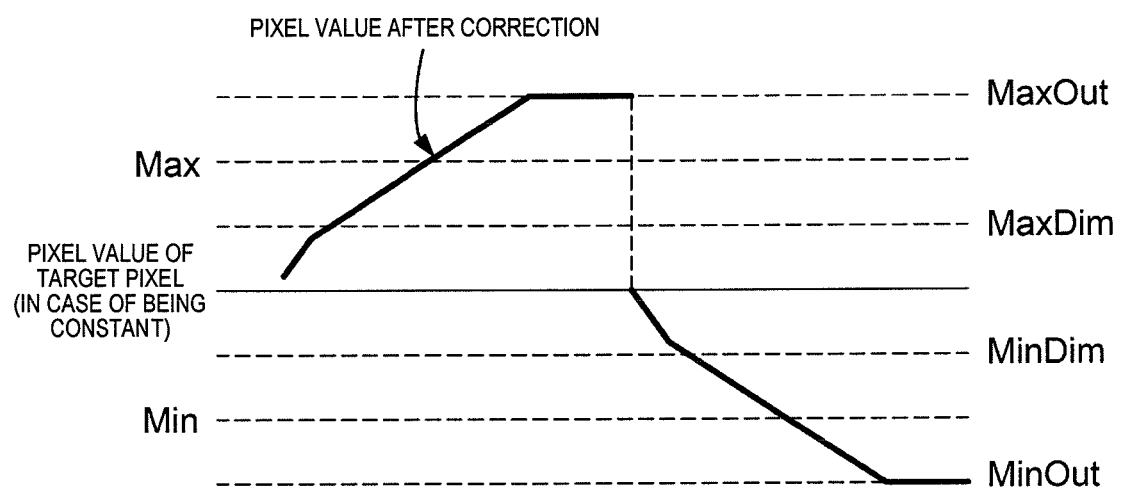
FIG. 6 is a diagram showing a mode of correction of the video signal.

FIG. 6 is a diagram for explaining a mode of correcting a video signal using such limit values and suppression values. In a case where the enhanced video signal is equal to or more than MinDim and equal to or less than MaxDim, the enhanced signal is output as it is as a video output signal. In a case where the enhanced video signal is larger than MaxDim and less than Maxout, the enhanced video signal, particularly the overshoot thereof, is somewhat suppressed and output as a video output signal by multiplying the enhanced video signal by a predetermined coefficient smaller than 1. In a case where the enhanced video signal is larger than or equal to Maxout, the enhanced video signal is output as a value equal to Maxout.

In a case where the enhanced signal is less than MinDim and larger than Minout, the enhanced video signal, especially the overshoot thereof, is somewhat suppressed and output as a video output signal by multiplying the enhanced video signal by the predetermined coefficient smaller than 1. In a case where the enhanced video signal is less than Minout, the enhanced video signal is output as a value equal to Minout.

In this way, the limit value of the output signal enhanced based on the maximum value and the minimum value and the texture value of the pixel value in the vicinity of the target pixel is set, and at that time, the enhanced signal is suppressed and applied relatively in the edge area, and the enhanced signal is relatively strongly applied in the texture area. In addition, suppression of the enhanced output signal may be realized by setting the limit value on the output signal, but it is also possible to gradually increase a suppression amount as the suppression amount approaches the limit value.

In this way, by controlling the output signal which is enhanced according to the characteristic of each area of the image, outline enhancement processing suitable for the characteristic of the image may be performed for each area of the image.

REFERENCE MARKS IN THE DRAWINGS

10 VERTICAL LOW-PASS FILTER
11 to 14 HORIZONTAL HIGH-PASS FILTER
15 to 18 VARIABLE GAIN UNIT
19 HORIZONTAL HIGH-PASS FILTER COMPONENT SYNTHESIS UNIT
20 HORIZONTAL LOW-PASS FILTER
21 to 24 VERTICAL HIGH-PASS FILTER
25 to 28 VARIABLE GAIN UNIT
29 VERTICAL HIGH-PASS FILTER COMPONENT SYNTHESIS UNIT
31 FEATURE AMOUNT EXTRACTION UNIT
32 min/max CORRECTION UNIT
33 SYNTHESIS UNIT

The invention claimed is:

1. A method for enhancing a video image for enhancing an outline in a video image by generating an outline enhancement signal as a function of a pixel signal value in an area set around each target pixel and applying the outline enhancement signal to the target pixel, the method comprising:

calculating a maximum limit value and a minimum limit value of an enhanced video signal value on the basis of the pixel signal value in the area set around the target pixel;

calculating a texture value as a scale value that indicates a variation of the pixel signal value in the area;

correcting the maximum limit value and the minimum limit value according to the texture value;

limiting the enhanced video signal value by the corrected maximum limit value and the minimum limit value; and giving the texture value as a value obtained by normalizing the value obtained by subtracting an absolute value of a difference in a number of times of increase and decrease from the sum of the number of times of increase and decrease of the pixel signal value so that the maximum value becomes 1.

2. The method for enhancing a video image according to claim 1, further comprising:

detecting a maximum value and a minimum value of the pixel signal value in an area set around the target pixel;

obtaining the maximum limit value of an enhanced video signal value by adding a product of a difference between the maximum value and the minimum value and the texture value to the maximum value; and obtaining a minimum limit value of the enhanced video signal value is obtained by subtracting the product of the difference between the maximum value and the minimum value and the texture value from the minimum value.

3. The method for enhancing a video image according to claim 1, further comprising:

setting a maximum suppression value larger than the pixel value of the target pixel and smaller than the maximum value, and a minimum suppression value smaller than the pixel value of the target pixel and larger than the minimum value;

decreasing the enhanced video signal value according to an exceeded amount in a case where the pixel signal value of the target pixel exceeds the maximum suppression value; and increasing the enhanced video signal value according to a lower amount in a case where the pixel signal value of the target pixel is lower than the minimum suppression value.

* * * * *